(12) United States Patent
Klusmann et al.

(10) Patent No.: US 9,049,756 B2
(45) Date of Patent: Jun. 2, 2015

(54) INTELLIGENT LIGHTING CONTROL SYSTEM AND NETWORK COMPRISING MULTIPLE-CHANNEL PHOTO SENSOR

(75) Inventors: Donald Louis Klusmann, Garland, TX (US); Michael Shawn Murphy, Allen, TX (US)

(73) Assignee: Koninklijke Philips N.V., Eindhoven (NL)

( * ) Notice: Subject to any disclaimer, the term of this patent is extended or adjusted under 35 U.S.C. 154(b) by 263 days.

(21) Appl. No.: 13/263,750

(22) PCT Filed: Mar. 29, 2010

(86) PCT No.: PCT/IB2010/051358
§ 371 (c)(1),
(2), (4) Date: Oct. 10, 2011

(87) PCT Pub. No.: WO2010/116283
PCT Pub. Date: Oct. 14, 2010

(65) Prior Publication Data
US 2012/0025717 A1    Feb. 2, 2012

Related U.S. Application Data

(60) Provisional application No. 61/168,142, filed on Apr. 9, 2009.

(51) Int. Cl.
H05B 37/00        (2006.01)
H05B 37/02        (2006.01)

(52) U.S. Cl.
CPC ........ H05B 37/0254 (2013.01); H05B 37/0263 (2013.01); H05B 37/0272 (2013.01);
(Continued)

(58) Field of Classification Search
CPC .... Y02B 20/48; Y02B 20/46; H05B 37/0218; H05B 37/0227; H05B 37/0254
USPC .................................................. 315/312–319
See application file for complete search history.

(56) References Cited

U.S. PATENT DOCUMENTS 4,649,323 A    3/1987  Pearlman et al.
4,651,180 A *  3/1987  Nishizawa et al. ........... 257/257

(Continued)

FOREIGN PATENT DOCUMENTS

JP    2003111154 A    4/2003
JP    2008523576 A    7/2008

(Continued)

OTHER PUBLICATIONS
TechTarget.com, "Photosensor", Apr. 5, 2005.*

(Continued)

*Primary Examiner* — Douglas W Owens
*Assistant Examiner* — Borna Alaeddini
(74) *Attorney, Agent, or Firm* — Meenakshy Chakravorty

(57) ABSTRACT

Multiple control modules (14, 16, 18) provide various power control functions including occupancy sensing, ambient light level sensing, manual touch switch (push button) preset stations, light dimming and power control relay switching. The control modules (14, 16, 18) are interconnected in a conventional four-wire local area network for executing different power control functions in response to remote wireless commands as well as preset manual switch commands at the wall box level. The local area network (12) supplies DC operating power and communicates programming command and control module status information signals to all network control modules (14, 16, 18). One or more control modules (14, 16, 18) include an infrared signal sensor, a laser signal sensor, a signal decoder, a data microcontroller, a parameter lookup table and multiple light emitting diodes (LEDs). The LED diodes are used individually or in combination, in one or more colors and blink rate, to indicate the programming mode, or provide sensor feedback, or indicate device status, according to information contained in a command signal transmitted by a remote programming unit (58).

12 Claims, 10 Drawing Sheets

(52) U.S. Cl.
CPC ........ *H05B37/0245* (2013.01); *H05B 37/0218* (2013.01); *H05B 37/0227* (2013.01); *Y02B 20/46* (2013.01); *Y02B 20/48* (2013.01)

(56) References Cited

U.S. PATENT DOCUMENTS

| | | | |
|---|---|---|---|
| 4,733,138 | A | 3/1988 | Pearlman et al. |
| 4,792,731 | A | 12/1988 | Pearlman et al. |
| 6,798,341 | B1 | 9/2004 | Eckel et al. |
| 7,557,524 | B2 * | 7/2009 | Chevalier et al. ............ 315/318 |
| 7,619,539 | B2 * | 11/2009 | Veskovic et al. ............. 340/4.3 |
| 2008/0265799 | A1 | 10/2008 | Sibert |
| 2009/0236910 | A1 * | 9/2009 | Yamada et al. ............... 315/154 |

FOREIGN PATENT DOCUMENTS

| | | |
|---|---|---|
| JP | 2008294834 A | 12/2008 |
| WO | 0235653 A2 | 5/2002 |

OTHER PUBLICATIONS

Texas Advanced Optoelectronic Solutions (TAOS), "TSL2560, TSL2561 Light-to-Digital Converter", Dec. 2005.*

* cited by examiner

DEFAULT OCCUPANCY SENSOR PARAMETER TABLE

| PARAMETER | SETTING | | | | | |
|---|---|---|---|---|---|---|
| | LOW | | MEDIUM | | HIGH | |
| SENSITIVITY | 1 | 3 | 5 | | | |
| TIME-OUT DELAY | 5 | | 10 | 15 | 20 | 25 | 30 |
| MODE | AUTO ON | | | | MANUAL ON | |
| RELAY | 1 | 2 | 3 | 4 | 5 | 6 | 7 | 8 |
| INTELLIGENCE | FIXED | CONSERVATIVE | | NORMAL | | AGGRESSIVE |
| PHOTO LEVEL | OFF | 1 | 2 | 3 | 4 | 5 | 6 | 7 |
| TEST | DISABLED | | | | ENABLED | |
| BUZZER | DISABLED | TONE 1 | | TONE 2 | | TONE 3 |

FIG. 7

AFTER HOURS OCCUPANCY SENSOR PARAMETER TABLE

| PARAMETER | SETTING | | | | | |
|---|---|---|---|---|---|---|
| | LOW | | MEDIUM | | HIGH | |
| SENSITIVITY | 1 | 3 | 5 | 10 | 15 | 20 | 25 | 30 |
| TIME-OUT DELAY | | | | | | |
| MODE | AUTO ON | | | | MANUAL ON | |
| RELAY | 1 | 2 | 3 | 4 | 5 | 6 | 7 | 8 |
| INTELLIGENCE | FIXED | CONSERVATIVE | NORMAL | AGGRESSIVE |
| PHOTO LEVEL | OFF | 1 | 2 | 3 | 4 | 5 | 6 | 7 |
| TEST | DISABLED | | | | ENABLED | |
| BUZZER | DISABLED | TONE 1 | TONE 2 | TONE 3 |

FIG. 8

PRESENTATION OCCUPANCY SENSOR PARAMETER TABLE

| PARAMETER | SETTING | | | | | | |
|---|---|---|---|---|---|---|---|
| SENSITIVITY | LOW | | | MEDIUM | | HIGH | |
| TIME-OUT DELAY | 1 | 3 | 5 | 10 | 15 | 20 | 25 | 30 |
| MODE | AUTO ON | | | | | MANUAL ON | | |
| RELAY | 1 | 2 | 3 | 4 | 5 | 6 | 7 | 8 |
| INTELLIGENCE | FIXED | CONSERVATIVE | | NORMAL | | AGGRESSIVE | |
| PHOTO LEVEL | OFF | 1 | 2 | 3 | 4 | 5 | 6 | 7 |
| TEST | DISABLED | | | | ENABLED | | | |
| BUZZER | DISABLED | TONE 1 | | TONE 2 | | TONE 3 | |

FIG. 9

INTELLIGENT LIGHTING CONTROL SYSTEM AND NETWORK COMPRISING MULTIPLE-CHANNEL PHOTO SENSOR

This invention relates generally to energy management control systems, and in particular to a lighting control system in which individual sensor modules and power control switches share device status information via a local area network and execute power control functions in response to remote infrared and laser wireless signal commands as well as wire-connected manual switch commands.

Lighting control systems which are pre-wired into homes as well as office buildings and school buildings during the construction phase are becoming increasingly sophisticated. The single circuit mechanical light switch has been replaced by multichannel, touch-sensitive controllers which can control multiple lighting channels and provide dimming for selected channels so that a user can customize the lighting in a particular room from a single control panel. Systems of this type are disclosed in U.S. Pat. No. 4,649,323 issued Mar. 10, 1987 entitled "Microcomputer-Controlled Light Switch" and in U.S. Pat. No. 4,733,138 issued Mar. 22, 1988 entitled "Programmable Multi-Circuit Wall-mounted Controller." Lighting levels for groups of channels may be stored in memory as preset levels which may be retrieved by the push of a single switch. Those preset controllers are typically wired to control the lighting circuits in a single room or area.

It is also possible to link multiple lighting level controllers to a single central control unit which includes a microcontroller. The microcontroller may be programmed to link several individual light control units in a particular group and place the group under control of a selected individual control unit within the group. Such a system is described in U.S. Pat. No. 4,792,731 issued Dec. 20, 1988 entitled "Multi-room Controller for Individual Light Controls." The system of that patent includes a centrally located control panel which may be used to control the various individual room or area lighting control units and group them as desired. A limitation of that system is that all programming must be accomplished at the central control unit. If the central control unit experiences a failure, the entire lighting system fails because all of the individual lighting control units are dependent upon the commands from the central controller in order to function. Also, the remote lighting control units lack the ability to program the central controller or to control each other except through the central controller.

Energy management of buildings and rooms within buildings require a combination of timers to turn lighting circuits On and Off at fixed times of the day and week, occupancy sensors to turn off circuits and lights when rooms or spaces are no longer occupied, and photocell sensors to adjust the lights in rooms and spaces to predetermined light levels. Most occupancy sensing systems use one or more circuits that provide contact closures to activate one or more relays when occupancy is detected. Photocell sensors that allow daylight harvesting also require additional wiring between relay packs, dimmers and occupancy sensors.

Occupancy sensors that monitor multiple areas require specific (and sometimes complex) wiring topologies to produce the desired results. Adding occupancy sensors and photocell sensors require many wires to interconnect the system. Changing the configuration of a room requires climbing a ladder and rewiring the system, which is a time consuming and costly undertaking. Programming all sensor units also requires a ladder to reach each unit, opening the sensor and manually adjusting jumpers or switches to a desired setting.

The lighting control system of this invention includes multiple control modules and intelligent switches, generally referred to herein as "network devices," that communicate and share device operational status information and programming commands with each other over a local area network. The network devices include sensors, manual switches, intelligent switches, relay modules, dimmers, and one or more DC power supplies. The control modules and intelligent switches communicate with one another over a network that is implemented using a twisted pair of data conductors and a twisted pair of low voltage DC power conductors. All network devices draw operating power from a common network power supply. The control modules include an alert device for indicating status either by sound, by using a beeper, or by sight using LED indicators to display operating mode and network device status. The system is particularly suited for lighting control and load dimming applications within an industrial plant, office building, school or home by means of motion detection, ambient light sensing, ON/OFF switching functions and dimming functions.

According to the lighting control system of this invention, multiple control modules and intelligent switches provide various power control functions including occupancy sensing, ambient light level sensing, manual touch switch (push button) ON/OFF and raise/lower, preset scene selection, light dimming and power control relay switching. The control modules and intelligent switches are interconnected in a four-wire local area network for executing different power control functions in response to remote wireless commands as well as preset manual switch commands at the wall box level. The local area network supplies DC operating power and communicates shared control information signals and network device operational status information to all control modules and intelligent switch devices.

While each control module and intelligent switch can be programmed manually using two internal switches, the modules can also be programmed remotely by wireless wide beam infrared and narrow beam laser command signals transmitted from a hand-held programming controller according to operating mode and programming mode selections made by an operator. Each control module and intelligent switch can also be programmed manually via a wall-mounted remote touch pad switch that is connected to the local area network. One control module contains a power pack and relay drivers with dry contact inputs for receiving commands from a remote intelligent switch or remote network.

The hand-held portable programming controller transmits infrared commands (for wide beam group assignment) to set a group of control modules into the program mode and transmits a laser beam (for narrow beam solo assignment) to select an individual module to be programmed The portable controller programs motion sensor (infrared) modules, light sensor (photocell) modules and power pack modules. The laser programming mode is used to select a specific module to be programmed when two or more control modules are located close to one another, or are located on a high ceiling where an infrared beam would spread so much that it would reach several modules, when only one module is to be programmed. The laser programming mode is used to select or deselect one and only one particular module for a solo programming assignment, or to select or deselect two or more particular modules for group programming assignment.

Each control sensor module includes one or more sensors for detecting, sensing and/or measuring one or more local environmental conditions of interest, for example light intensity, thermal energy, physical movement, temperature, vibration and sound. In the exemplary embodiment, control modules are equipped with a passive infra-red (PIR) sensor for detecting thermal motion, a photocell sensor for sensing and measuring ambient light, an infrared sensor for sensing the IR spectrum of sunlight, an infrared receiver for receiving a wide area infra-red command signal from a remote transmitter, a laser receiver for receiving a narrow beam laser command signal from a remote transmitter, a communication transceiver, a data microcontroller and multiple light emitting diodes (LEDs). The LED diodes are used individually or in combination, in one or more colors and blink rate, to indicate the programming mode according to information contained in command signals transmitted by a remote programming unit, or provide sensor feedback, or indicate network device operational status. Programming command signals and device status information are shared by all control modules and intelligent switches that are connected to the signal conductors of the local area network.

Any one of the lighting control modules can function as a central or master controller that can control any of the other lighting control modules on the network. The failure of any particular lighting control module therefore has no effect on the network beyond its immediate local effect, and it may be bypassed or its functions replaced by other lighting control modules.

Moreover, various types of remote switches may be connected to the local area network and selected lighting control modules may be programmed to respond to remote commands from those units. One such type of remote switch unit includes manually operable preset switches which can simultaneously adjust lighting levels on multiple lighting channels controlled by any particular one or more lighting control modules. Another type of remote switching unit is a preset raise/lower switch which raises or lowers lighting levels on selected channels controlled by particular lighting control dimmer modules. Data inputs are also provided for receiving programming commands from a remote network.

For example, a lighting control dimmer module which controls the lighting in the entryway of a residence may be programmed to respond to a remote control switch module located in an upstairs bedroom so that all lights in the entryway may be turned on to a preset level by the upstairs remote. Other lighting control modules downstairs in the residence can be slaved to the same control module, causing all the lights downstairs in the residence to come full ON when that single switch is activated. Similarly, a downstairs remote preset switch may be selected to control all upstairs lighting levels so that all lights may be turned OFF when leaving the residence by activating this single switch. Whether or not any particular lighting control module responds depends on whether it has been so programmed.

Comparable or corresponding parts are identified by the same reference numerals throughout the detailed description and the several views of the drawing, wherein.

Figure 2:
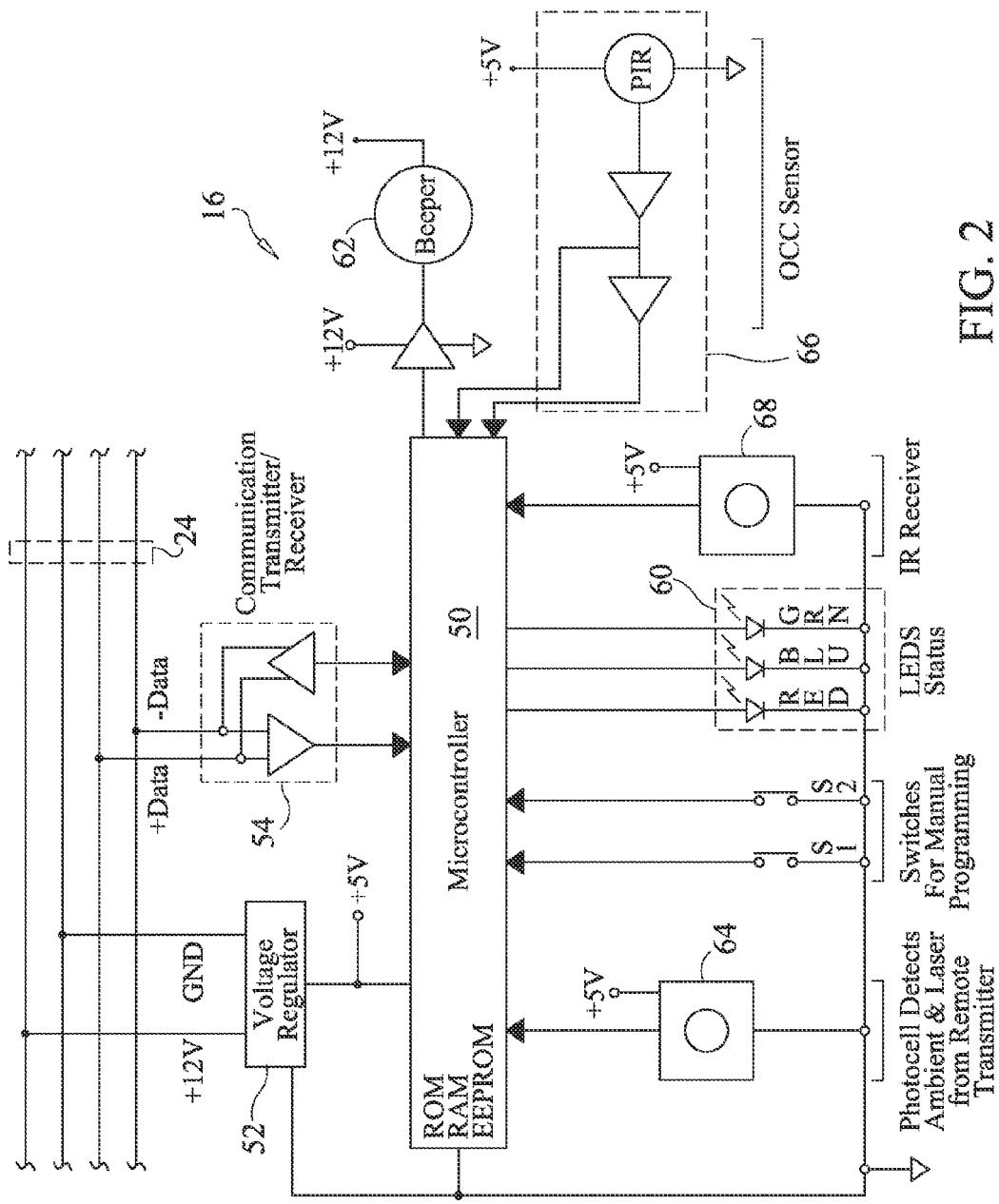
FIG. 2 is a simplified wiring diagram showing the principal components of an occupancy sensor module.

FIG. 7 is a table identifying the operational parameters that control the performance of the occupancy sensor module of FIG. 2, and showing the various programmable settings associated with each parameter, and further indicating a particular combination of parameter settings that configure the occupancy sensor module for automatic operation in the "day" mode in response to a system turn-on command FIG. 8 is a table identifying the parameters that control the performance of the occupancy sensor module of FIG. 2, and showing the various programmable settings associated with each parameter, and further indicating a particular combination of parameter settings that configure the occupancy sensor for manual operation in a user-defined operating mode, for example an "after-hours" operating mode in response to a manually entered system override command.

FIG. 9 is a table identifying the parameters that control the performance of the occupancy sensor module of FIG. 2, and showing the various programmable settings associated with each parameter, and further indicating a particular combination of parameter settings that configure the occupancy sensor for manual operation in another user-defined operating mode, for example a "Lights Off" or "Theater" operating mode to be used, for example, in a school classroom during nap time (Kindergarten) or during a film or slide show presentation (high school).

Figure 10:
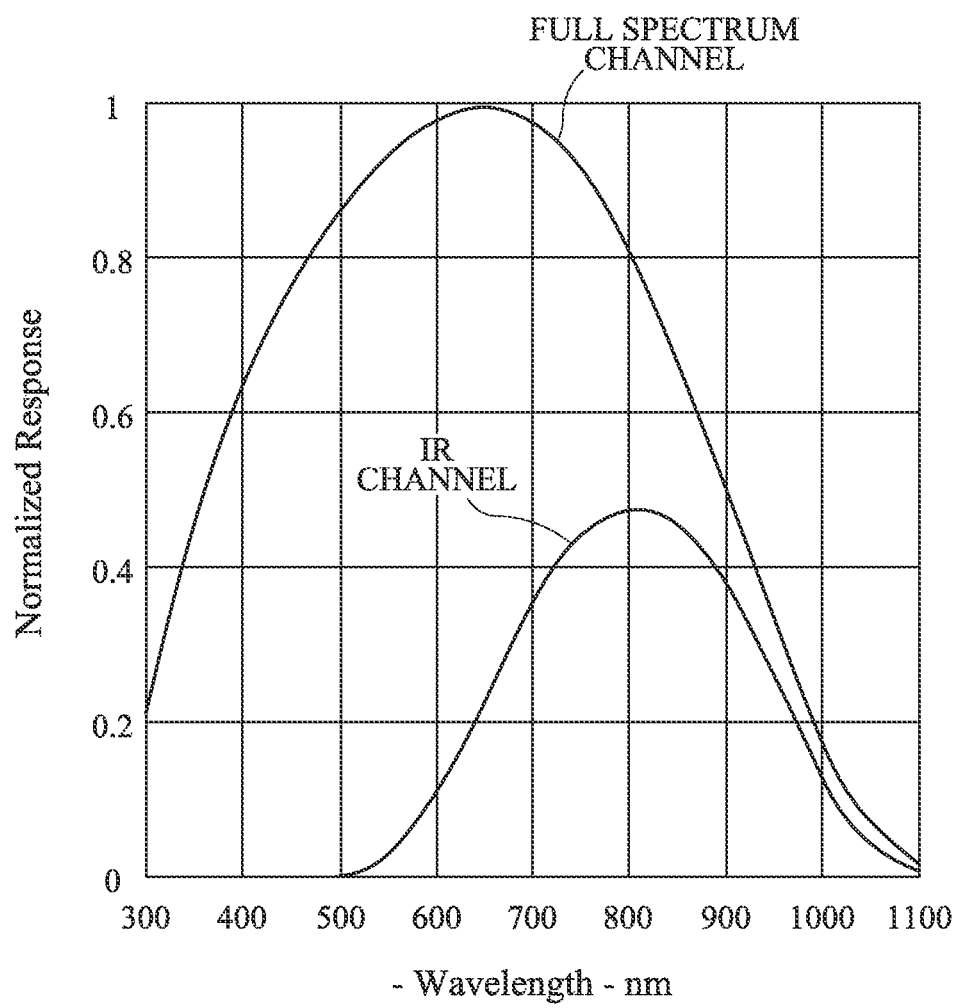

FIG. 10 is a graph which indicates the spectral responses of a multi-channel photocell sensor which is capable of distinguishing between artificial light (visible "human eye" wavelengths) and sunlight (visible plus infrared wavelengths).

Figure 1:
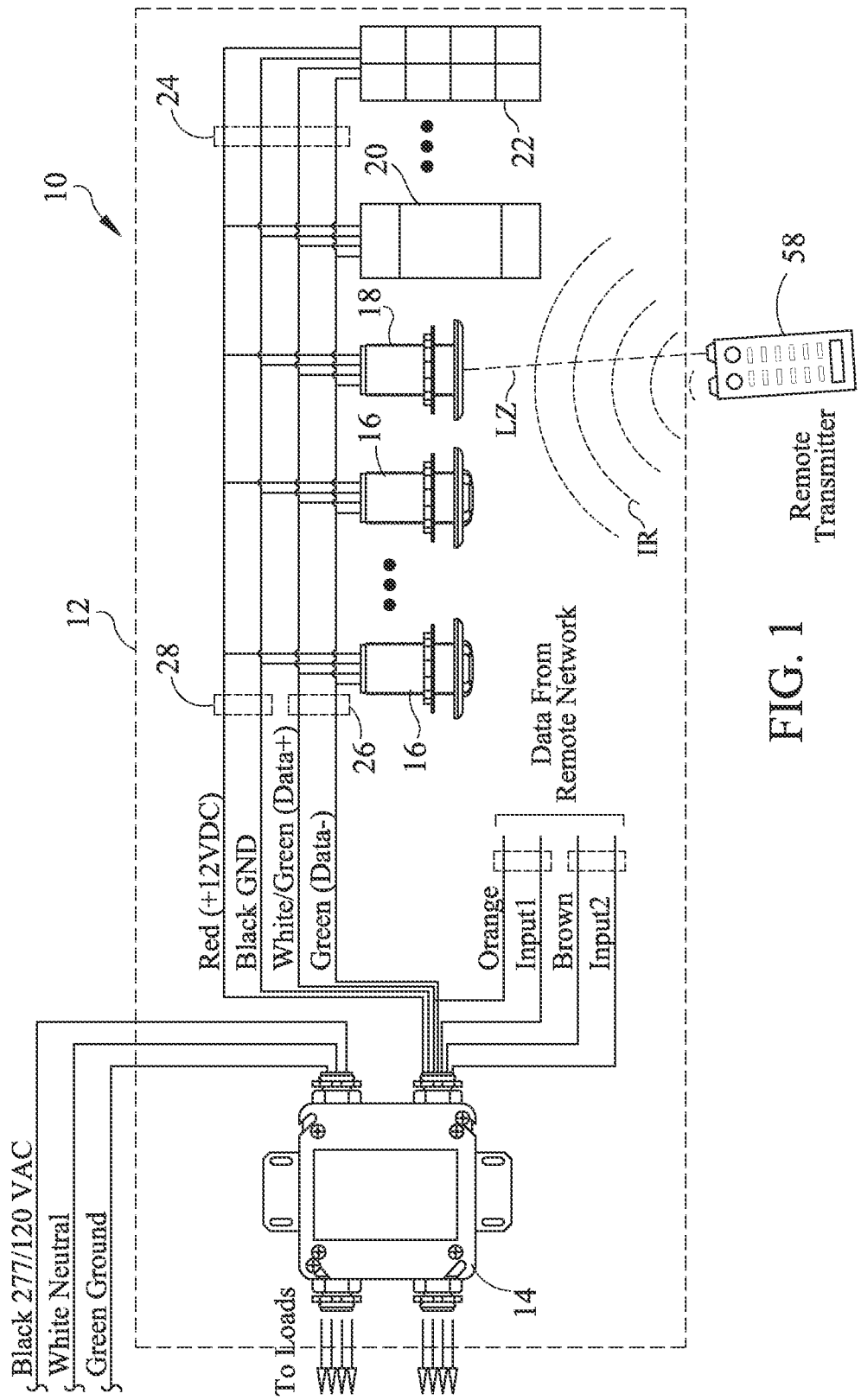
FIG. 1 is a simplified wiring diagram showing the principal components of a power control system connected in a local area network.

Referring now to FIG. 1, a lighting control system 10 constructed according to the invention is connected in a network 12. In this exemplary embodiment, the network is a hard-wired local area network (LAN). The principal components of the control system 10 include a power pack module 14; one or more occupancy sensor modules 16; a light sensing photocell module 18; a multiple-button, wall-mounted intelligent switch 20, shown in a two-button (raise/lower) embodiment; and a wall-mounted intelligent switch 22, shown in an eight-button (preset scene select) embodiment. These components are interconnected by a four conductor bus 24 which is formed by two shielded, twisted pair wire conductors, one pair 26 for +data, −data (white, green) and one pair 28 for DC power +12 VDC and Ground (red, black). The exact system configuration is determined by the user and may contain additional lighting control modules if desired, as well as more or fewer preset remote switches and raise/lower remote switches.

The control system 10 is configured with application code software and device control firmware to control the supply of operating power to lighting loads of various kinds, fluorescent and incandescent, both dimming and non-dimming, and optionally one or more accessory loads, for example motor loads, for execution of non-lighting functions such as shade control or presentation screen raise/lower functions. In the exemplary embodiment shown in FIG. 4, the system 10 controls the supply of AC operating power via power switching relays 30, 32, 34, 36 to a group of electronic dimming ballasts 38, 40, 42 and 44. Electronic dimmer circuits 46, 48, . . . supply either 0-10 VDC or pulse-width modulated DC voltage (HDF) to the dimming ballasts for controlling the brightness output of fluorescent lamps FL1, FL2, FL3 and FL4.

The control modules 14, 16 and 18 and the switch modules 20, 22 of the control system 10 are characterized as being "intelligent" in the sense that each control module and switch module comprises a data processor in the form of a microcontroller 50 with ROM memory in which operating program instructions, application program code, firmware program code and default module configuration parameters are stored; EEPROM memory in which device control firmware is stored; and RAM memory in which information relating to configuration parameter settings, sensed environmental data and network device status information are stored.

The entire control system 10 is characterized as being intelligent in the sense that the system comprises intelligent sensing modules and intelligent switches interconnected in a network in which network commands, configuration parameter settings, device status information and information relating to sensed environmental data are shared contemporaneously by all sensing modules and switches. Moreover, each control module is capable of dynamically reconfiguring its parameter settings in response to locally sensed environmental conditions as well as device status information and commands communicated over the network from other control modules and intelligent switches, and executing power control functions dynamically in response thereto, as local conditions change.

Figure 4:
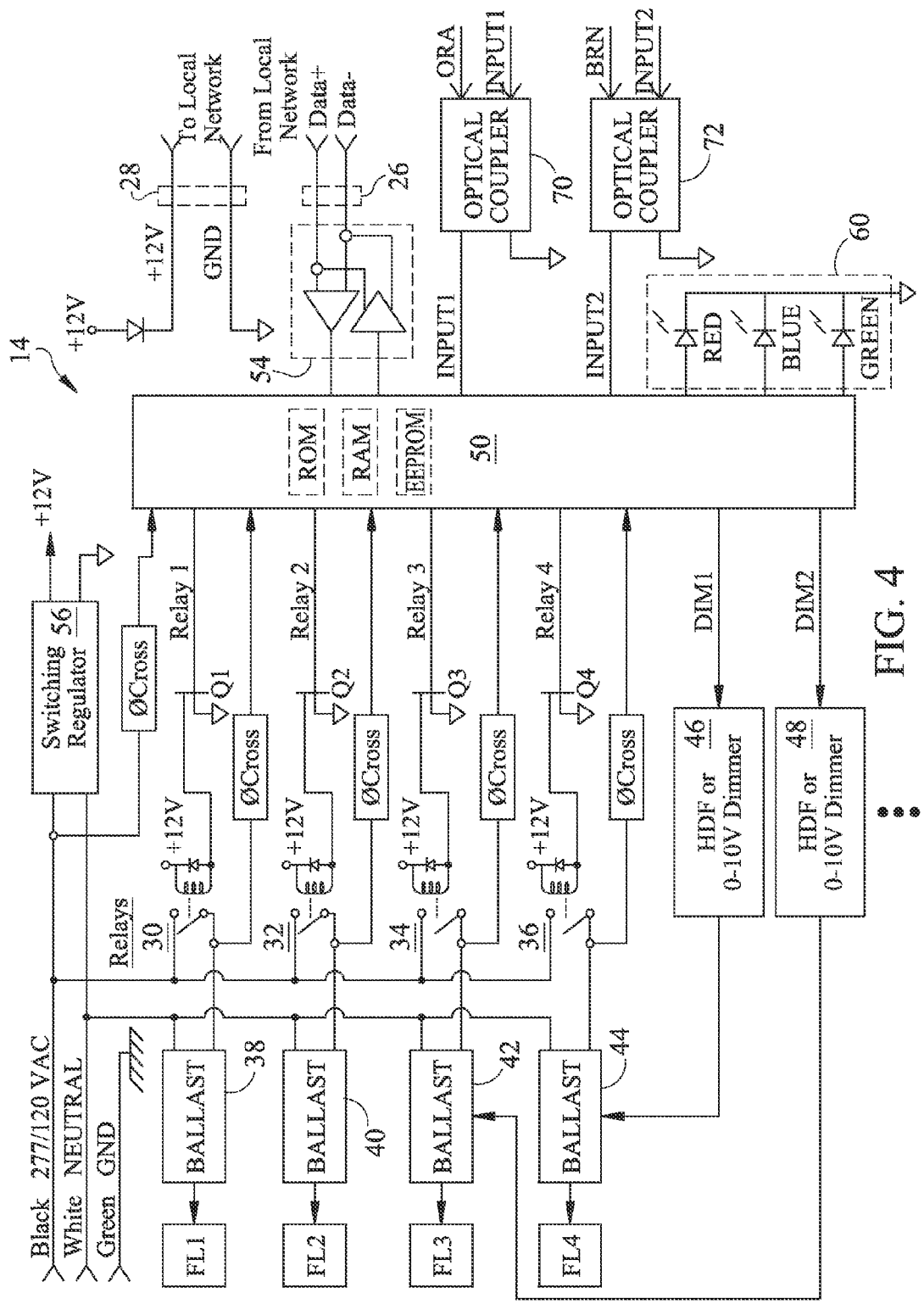
FIG. 4 is a simplified wiring diagram showing the principal components of a power pack module that includes a power supply, relay drivers, electronic ballasts and dimmers for supplying operating power to multiple lighting loads.
Figure 5:
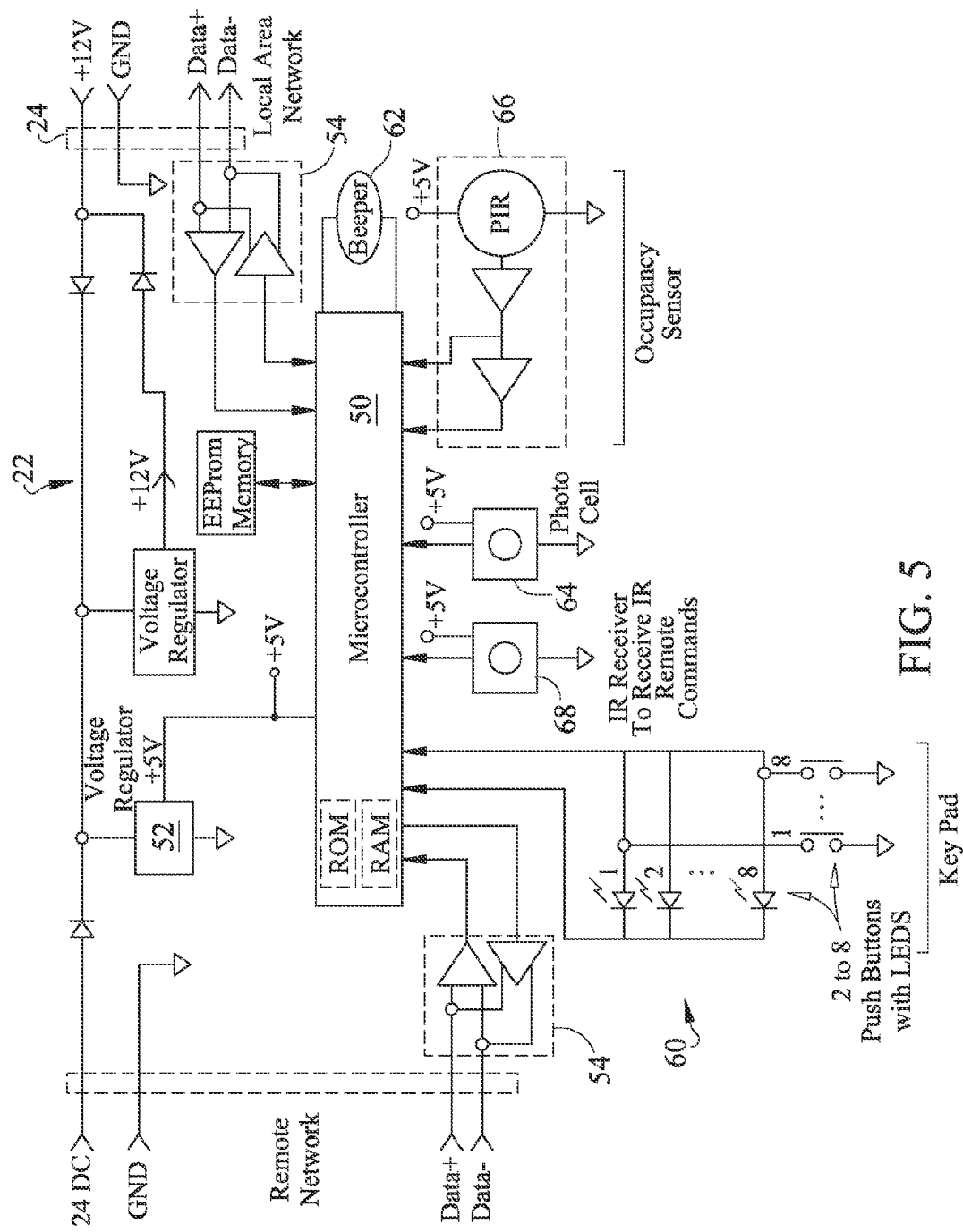
FIG. 5 is a simplified wiring diagram showing the principal components of an intelligent wall switch module.

Referring now to FIG. 4, conventional service components are connected to the microcontroller 50, including clock circuitry, zero crossover detection circuitry ΦCross, one or more regulated DC power supplies, and a communication transceiver 54. In response to data communicated over the network 12, the microcontroller 50 provides command outputs to the dimming circuitry, for example Dim 1 and Dim 2 which drive ballast dimming circuits 46, 48. The microcontroller also produces command outputs Relay 1, Relay 2, Relay 3 and Relay 4 to relay driver circuits formed by switching transistors Q1, Q2, Q3 and Q4. The switching transistors provide a ground path for conducting DC actuating current through the field windings of air-gap relays 30, 32, 34 and 36.

The data processor 50 is a conventional microprocessor or microcontroller. For use in a conventional EIA protocol compatible network according to the exemplary LAN embodiment 12, the data processor 50 is a microcontroller, Part No. PIC18F1320 manufactured by Microchip Technology, Inc. of Chandler, Ariz. Detailed specifications and operational information on the Microchip Technology microcontroller 50 can be found in the PIC18F1320 Data Sheet entitled "28 Pin 8-Bit CMOS Flash Microcontroller," published by Microchip Technology, Inc. and incorporated herein by reference. The microcontroller 50 includes RAM and ROM memory devices for firmware program storage and EEPROM for storing downloadable application software and the various constants and operational parameters used by each control module.

The power pack module 14 includes a DC power supply 56 which supplies regulated voltages needed by the internal circuitry of the control modules. In addition to the internal power needs, the DC power supply 56 provides a supply voltage for use by external devices. For example, regulated +12 VDC is provided for use by one or more external loads, for example sensors.

A conventional clock circuit provides the clock signals required by the microcontroller and the remaining circuitry. The clock circuit may comprise one or more crystal oscillators for providing a stable reference clock signal. A reset monitor circuit provides a power-up reset signal to the microcontroller 50 in response to power interruption. The circuit also monitors the output of the source AC power supply. If the source voltage drops too low, the reset circuit generates a reset signal to avoid unstable operation that may be caused by low voltage operation.

Each control module and intelligent switch communicates and shares information with other devices on the network. Two-way communication of data and commands is provided by a communication transceiver 54 that interfaces each control module to the network 12. The communication transceiver may comprise any conventional communication/network interface device. The choice of network protocol, in addition to the choice of media, determines the requirements for the communication transceiver. The communication protocol used in the exemplary embodiment of this invention is a half-duplex, multipoint serial communications channel employing differential balanced signaling over twisted pair conductors in which network hardware devices are connected as a series of point-to-point nodes, for example the EIA-485 communication protocol.

Using the EIA-485 protocol twisted pair network 12 of the exemplary embodiment, the communications transceiver 54 is a RS485 interface transceiver Part No. ST485B manufactured by ST Microelectronics of Geneva, Switzerland. The transceiver 54 includes the necessary components to interface each sensing module and intelligent switch for two-way digital data communication over the twisted pair network 12. Transmit data from the control module 14 is input to the transceiver 54 which encodes and processes the data for transmission over the twisted pair 26 data conductors Data+, Data−. In addition, the transceiver 54 receives, decodes and conducts data and commands received over the network 12 from other network devices.

The communication transceiver 54 enables each control module and intelligent switch in the network 12 to share information with all other network devices. In the exemplary embodiment, the communication transceivers are adapted to transmit and receive data over twisted pair wiring. The communication transceivers could be adapted to other type of media including, but not limited to, power line carrier, coaxial, fiber optics and wireless RF signaling.

As described above, each control module also includes means for controlling various lighting loads. In the exemplary embodiment shown here, three different types of loads can be controlled, including ballasts (dimming and non-dimming) for fluorescent lamps, any electrical load that can be controlled by closure of a relay contact, and a passive (resistive) load. Ballast load commands DIM 1. DIM 2 from the microcontroller 50 of the power pack control module 14 are applied to one or more dimmers, for example ballast dimming circuits 46, 48 for driving one or more dimming ballasts 38, 40, 42, 44. The outputs of the dimming ballasts are applied to one or more fluorescent lamps FL1, FL2, FL3, FL4 in response to operation of relay driver circuits. The relay driver circuits are formed by switching relays 30, 32, 34, 36 and switching transistors Q1, Q2, Q3 and Q4, which are actuated in response to relay command signals Relay 1, Relay 2, Relay 3, Relay 4 produced by the microcontroller 50.

A schematic diagram illustrating the relay driver circuit portion of the power pack control module 14 is shown in FIG. 4. Each relay driver circuit includes a transistor switch, for example Q1, for controlling the conduction of current through the field winding of a switching relay 30. A relay load signal Relay 1 from the microcontroller 50 is input to the base of transistor switch Q1 via a resistor voltage divider circuit. The relay field coil is connected in parallel with a protective diode between the +12 VDC supply and the collector of transistor Q1. The diode suppresses the back EMF generated by the field winding when it is de-energized. In response to commands from the microcontroller 50, the circuit opens and closes the relay contacts that connect the power input terminal of the ballast 38 to operating voltage, either 277 VAC or 120 VAC supplied from a remote utility power source.

The ballast dimming circuits 46, 48 of the power pack module 14 are conventional in design and operation, and include an operational amplifier and associated components which function to output a signal in the range of 0 to +10 VDC. The electronic ballasts are adapted to output a driving voltage in proportion to the DC input that will produce the desired light intensity level. The electronic ballasts adjust the voltages applied to the lamps they are connected to in accordance with the level of the DC input ballast-dimming signal. Either 0 or 10 VDC corresponds to the ON or maximum controlled state and the other voltage extreme, i.e., +10 VDC or 0 respectively, corresponds to the OFF or minimum controlled state. The voltages in between correspond linearly with the controlled brightness of the fluorescent lamps.

The zero crossing detection circuit ΦCross portion of the power pack module 14 generates a zero crossover signal every half cycle of the AC input phase that is monitored by the microcontroller 50. At each zero crossing of the AC voltage, a short pulse is generated which the microcontroller 50 can detect.

The lighting control system 10 of the exemplary embodiment can control up to sixteen lighting channels in a given space or room without any interaction from a central controller or other units. To program the same parameter (Time, Relay, Sensitivity, . . . ) into multiple sensor modules that combine to give a wide area of coverage, requires the selection of one of the sensor modules and then actuating the Select All button on a remote programming unit 58, which transmits a wide beam infra-red signal IR. The LED status indicators 60 of all sensor modules will light up (Blue) to indicate they are selected. Sensor modules can be added or removed from global programming by directing a laser beam LZ at the desired sensor module.

Each occupancy sensor module 16 includes a cluster 60 of three LED status indicators (Red, Blue, Green) that are used individually or in combination to indicate operation in the Programming Mode, Sensor Feedback, and Status. Once selected, a single sensor module can be commanded to program its own occupancy parameters (Blue LED), multiple occupancy sensor parameters (Blue, Red LEDs), switches or pushbuttons (Red LED), dimmers or photocell parameters (Green), etc. While the sensor modules are in Test or Normal mode, the colors and the blink rates of the LED indicators can be used to indicate sensor status for example, occupancy detected, sensor module in time-out and ambient light intensity levels.

To read back a parameter setting of a control module, the operator toggles through the various parameters to be read back and actuates the Read button on the remote programming unit 58. The LED indicators will blink either Red (parameter not programmed) or Blue (parameter is programmed). For example, to verify the sensitivity setting on an occupancy sensor module 16, an operator enters the setting feedback mode and selects sensitivity. Then the operator actuates the low sensitivity button on the remote programming unit 58. If the LEDs of the occupancy sensor module flash red, that means that low sensitivity is not the current setting on the sensor. The operator can then toggle through each subsequent sensitivity setting until the sensor flashes blue, which indicates that the control module is set to the respective setting which corresponds to the key-press on the remote transmitter.

Figure 6:
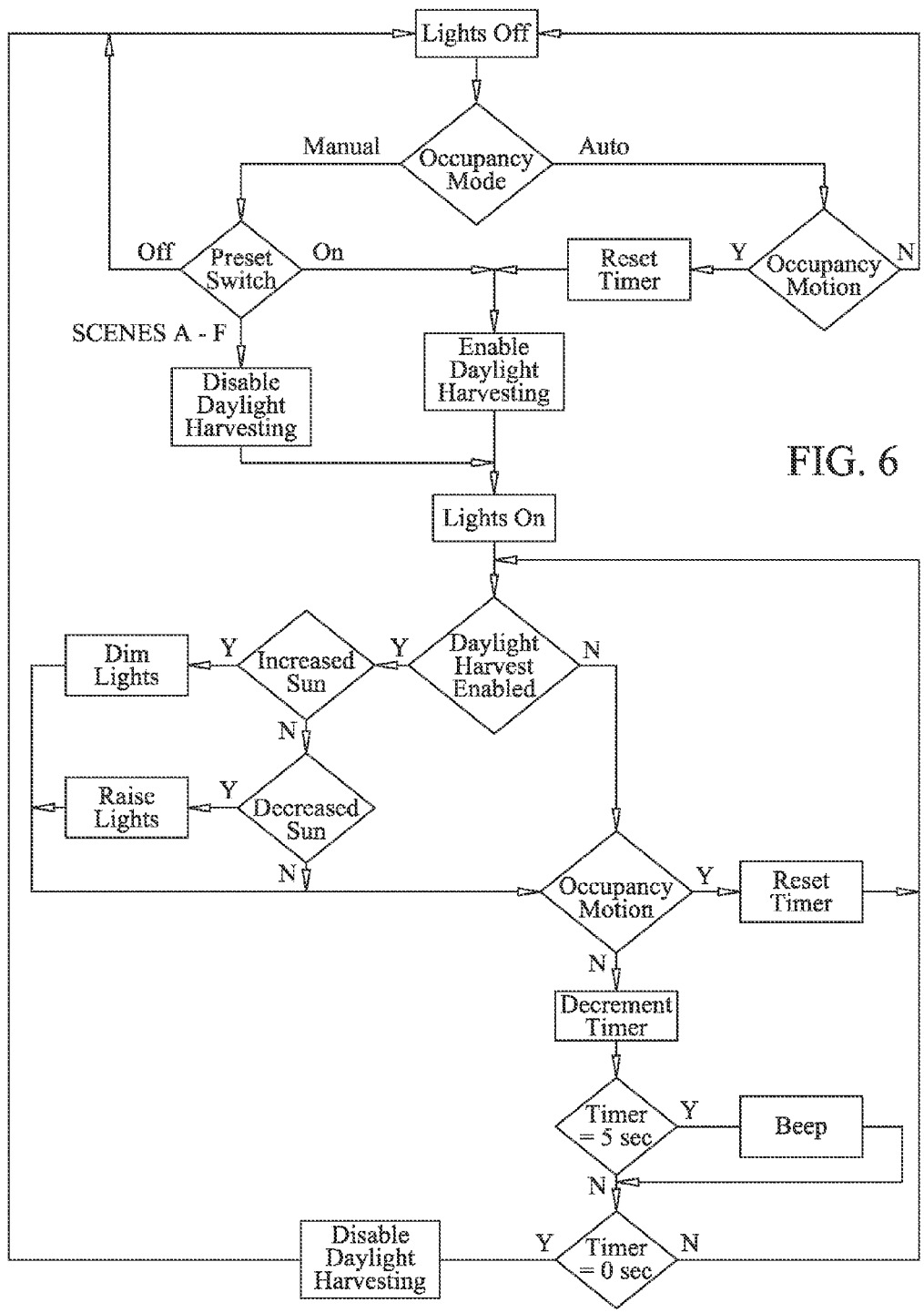
FIG. 6 is a flow chart which illustrates logical decisions made by occupancy control modules and intelligent switches during operation of the lighting control system in the occupancy sensing mode and daylight harvesting mode.

Referring again to FIG. 2, the occupancy sensor module 16 controls an air-gap relay or dimming load in response to the detection of motion in a defined area. The occupancy sensor module 16 includes an ambient light intensity photocell sensor 64 and a motion detector sensor 66 which produce device status information that is used to perform various tasks, including occupancy sensing, daylight harvesting and dimming control. A block diagram showing the logical decisions made by the control system 10 in response to device status information communicated over the network 12 by an occupancy sensor module 16, a photocell sensor module 18 and a preset (scene select) intelligent switch 22 is shown in FIG. 6. In addition to occupancy sensing, a light harvesting task can be implemented. Light harvesting utilizes the ambient light intensity level sensed by the photocell sensor 64.

The occupancy sensor module 16 includes a passive infrared (PIR) motion sensor 66 that is responsive to changes in infra-red energy for detecting movement within a defined area. The passive infra-red motion sensor 66 is Model No. LHi 1128 manufactured by Perkin Elmer Optoelectronics Corporation of Freemont, Calif. Detailed specifications and operational information on the Model No. LHi 1128 PIR motion sensor 66 can be found in the Data Sheet entitled "Pyroelectric Detector LHi 1128," published by Perkin Elmer Optoelectronics Corporation and incorporated herein by reference.

When occupancy is detected, the PIR sensor 66 generates a command that enables execution of occupancy task application software in the ROM of the microcontroller 50. The occupancy task first checks the current level of the light. If light harvesting is enabled, the lights turn ON in accordance with the light harvesting task. The ambient light level is periodically measured by the photocell sensor 64 and the brightness of the lights are adjusted accordingly. If light harvesting is not enabled, and if the last light level value was not equal to zero, i.e., completely OFF, then the level of the lights will be set to the last dim level that was set at the time the lights were last turned off. If the last light level value was equal to zero then the level of the lights will be set to a predetermined value, for example maximum brightness.

The occupancy sensor module 16 periodically sends an occupancy status update signal over the network to all other modules and intelligent switches. This information is stored in RAM memory of the other network devices. Each control module uses this information as reference data in connection with the execution an assigned task. Also, the microcontroller 50 of each control module compares the updated occupancy status information with the previous status and changes the set value of one or more of its operating parameters to a different value selected from its set of stored operational values at least in part in response to the outcome of that comparison.

Examples of the various combinations of occupancy sensor parameter values that can be invoked during operation of the control system 10 in Default, After Hours and Presentation occupancy sensing modes are shown in FIG. 7, FIG. 8 and FIG. 9.

The occupancy sensor module 16 is supplied with +5 VDC operating power from the voltage regulator 52. Data is communicated to and received from other network-connected control modules and switch modules via a two-way transceiver 54.

The light sensor module 18 includes a light-to-digital, dual channel photocell sensor 64 for sensing and measuring the intensity of ambient light. A wide band channel of the sensor 64 senses ambient light over the entire spectrum (visible and IR) in the local area being monitored. The wide band channel approximates the human eye response and provides a digital output of ambient light intensity measurements. The wide band channel also senses narrow beam laser light programming signals that are transmitted by the remote controller 58.

A narrow band channel of the photocell 64 is responsive to light in the IR spectrum only, and provides a digital output that is used for indirect as well as direct sunlight intensity measurements, for example when operating in the daylight harvesting mode.

The dual channel photocell sensor 64 is Part No. TSL2560 manufactured by Texas Advanced Optoelectronics Solutions Inc. (TAOS) of Plano, Tex. Detailed specifications and operational information on the TSL2560 dual channel photocell sensor can be found in the Data Sheet entitled "TSL2560, TSL2561 Light to Digital Converter," published by TAOS and incorporated herein by reference.

Figure 3:
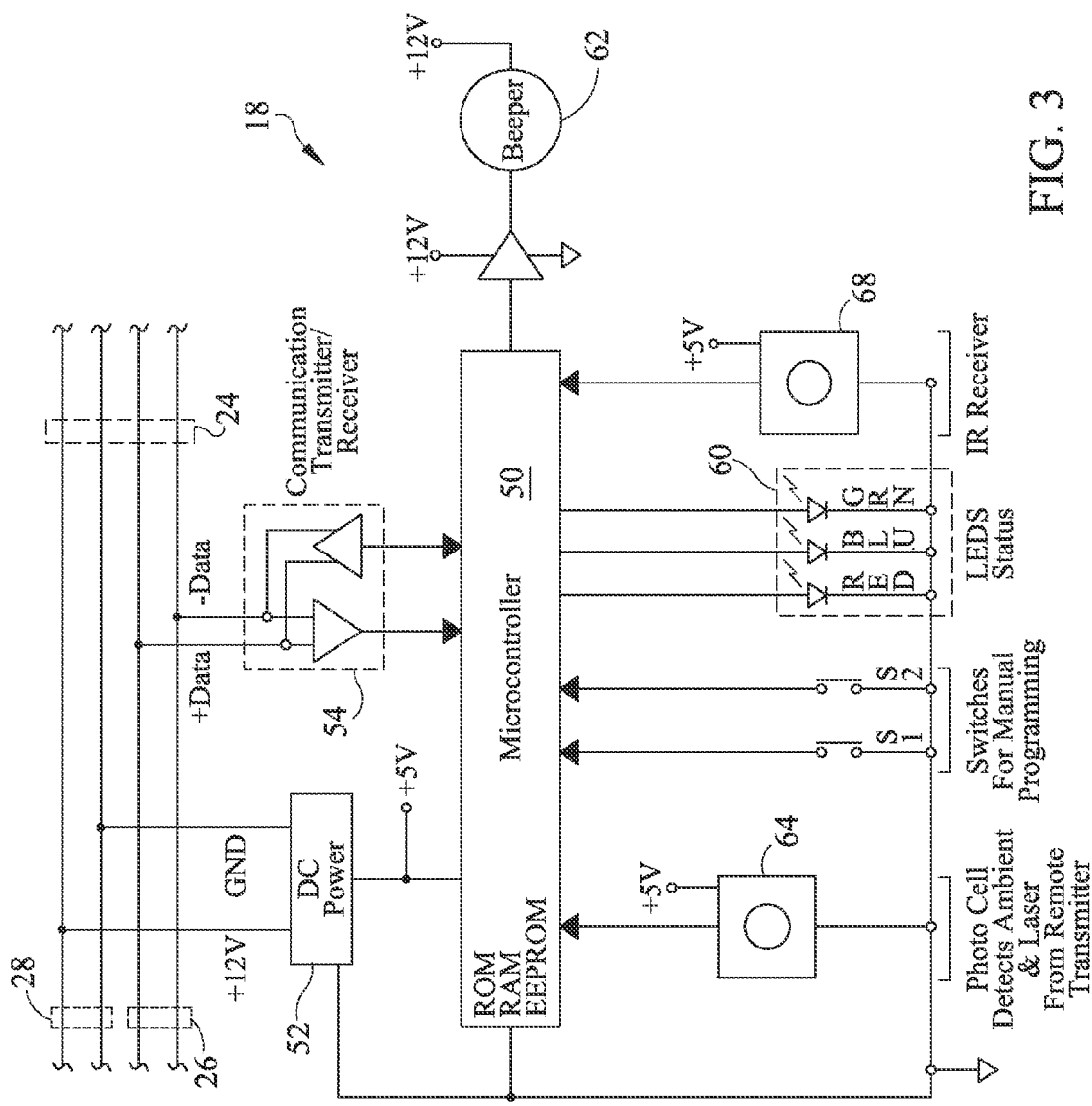
FIG. 3 is a simplified wiring diagram showing the principal components of a photocell module.

Referring now to FIG. 3, the multi-channel photocell module 18 senses and measures the intensity of ambient light in a defined area. The construction of the photocell module 18 is identical to the occupancy sensor module 16 in all respects, except that the occupancy sensor 66 is omitted. The photocell module 18 includes an IR receiver 68 for receiving wireless wide beam infrared program commands from the remote programming controller 58. The multi-channel photocell sensor 64 includes one channel that receives narrow beam laser program commands from the remote programming controller 58.

The photocell sensor module 18 sends device status signals over the network to all other modules and intelligent switches. The photocell sensor module status signals contain local environmental condition information (e.g., ambient light intensity) and device operational status (e.g, lights ON/OFF, dimming mode enabled/disabled, daylight harvesting enabled/disabled, lumen maintenance enabled/disabled) which are received and stored in RAM memory of the other network devices. Each control module uses this information as reference data in connection with the execution of an assigned task. Also, the microcontroller 50 of each control module compares the updated light intensity and device status information with previously stored information and changes the set value of one or more of its operating parameters to a different value selected from its set of stored operational values at least in part in response to the outcome of that comparison.

Likewise, each occupancy sensor module 16 sends device status signals over the network to all other modules and intelligent switches. This occupancy sensor status signal contains device operational status information (e.g., manual mode, automatic mode, motion detected) which is received and stored in RAM memory of the other network devices. Each control module uses this information as reference data in connection with the execution of an assigned task. Also, the microcontroller 50 of each control module compares the updated occupancy sensor status information with previously stored information and changes the set value of one or more of its operating parameters to a different value selected from its set of stored operational values at least in part in response to the outcome of that comparison.

Each intelligent switch 20, 22 also sends device status signals over the network that contain information relating to its current setting (e.g., ON, OFF, scene selection, raise/lower value) which are received and stored in RAM memory of the other network devices. Each control module uses this information as reference data in connection with the execution of an assigned task. Also, the microcontroller 50 of each control module compares the updated switch status information with previously stored information and changes the set value of one or more of its operating parameters to a different value selected from its set of stored operational values at least in part in response to the outcome of that comparison.

A set of switches S1, S2 are contained in the module 16 and in the photocell module 18 for manually entering programming commands. An array 60 of LED indicator lamps (Red. Blue, Green) provide visual feedback of module programming status. A conventional infra-red sensor 68 receives pulsed IR signals from the remote controller 58 for inputting programming commands into the microcontroller 50. The infra-red sensor 68 is a remote control IR receiver, Part No. TSOP62 manufactured by Vishay Intertechnology, Inc. of Malvern, Pa. Detailed specifications and operational information on the remote control IR receiver 68 can be found in the Data Sheet entitled "IR Receiver Modules for Remote Control Systems," Document No. 82177 published by Vishay Intertechnology, Inc. and incorporated herein by reference.

The control modules can be interconnected and programmed to control common or different circuits. This allows assigning (or reassigning) the interconnection of loads to sensors without needing to rewire the system. Also, the control modules can be programmed to allow common or different timeout delays.

For example, a hallway and two restrooms can be connected on one network to allow one occupancy sensor module in the hallway and one occupancy sensor module in each restroom to control the hallway lighting circuit. As long as motion is detected in the hallway or in either restroom, the hallway lighting circuits will be maintained ON.

According to another example, a restroom or utility room is monitored by a single occupancy sensor module 16 located near the entry (with one minute timeout delay) and another located near the back of the room (with a 10 minute timeout delay). This allows an occupant to perform a quick task near the entry, for example to pick up a supply item, within a one minute timeout delay. If the occupant goes further into the room, for example to search through files, a 10 minute timeout delay is set.

The occupancy sensor modules 16 contain a beeper 62 that sounds an audible signal indicating that the lights will turn Off soon, for example in 5 seconds. The beeper tone can also be used for feedback when programming sensor modules, whether manually or remotely.

The occupancy sensor control modules 16 can be programmed into intelligent operation mode to allow the modules to auto-select the most efficient timeout delay based on occupancy patterns that have previously been monitored and stored in RAM memory.

Several parameters of the control modules 16 can be dynamically adjusted to permit the power control system 10 to modify how it functions on a temporary basis. For example, in the Test Mode, the timeout delays in all occupancy sensor modules can be temporarily changed to minimum timeouts (15 minutes of programmed delay becomes 15 seconds). This allows the lighting control system 10 to be rapidly tested by leaving the room (or standing still) for only 15 seconds rather than 15 minutes. During operation in Test Mode, the LEDs will also blink for sensor status verification (Red=Test Mode; Blue=Occupancy Detected; Green=Timeout Delay not ready to turn the circuit OFF).

When rooms are to be combined, the sensor modules should also be linked and set to longer timeout delays to handle the additional communication delays. By sending a Set Alternate Timeout command, all sensor control modules can be set to increase their timeout delays to a greater delay.

During times when the building management system has issued a Sweep Off Command to selected rooms, the sensor modules can reduce their timeout delay to a shorter time to allow the circuits to turn off in a shorter time, saving more energy during times when janitor crews are moving from room to room.

Referring now to FIG. 3 and FIG. 10, the dual-channel photocell sensor 64 of the module 18 allows the module to select either sunlight (open loop) or artificial light (closed loop) sensing. This is made possible by the multi-channel spectral response of the photocell sensor 64, shown in FIG. 10, which allows the sensor to distinguish between artificial light (visible "human eye" wavelengths) and sunlight (full spectrum visible plus infrared wavelengths). When the dimmers 46, 48, . . . are to be controlled based on the amount of sunlight entering a room, the sunlight (open loop) channel of the photocell 64 is enabled. When the dimmers 46, 48, . . . are to be controlled for constant room light, the artificial light (closed loop) channel of the photocell 64 is enabled. This allows the photocell sensor module 18 to adapt to the available light in the area to be monitored, thus making the position and orientation of the photocell 64 relative to a source of light a less critical factor for good performance. Although conventional photocell units require the careful positioning or aiming of the photocell sensor element, special positioning or aiming of the dual-channel photocell sensor of FIG. 3 is not required.

The multiple-channel photocell sensor module 18 can process broad wave lengths of light sources and select which to use in a specified application. This allows it to distinguish between artificial light (visible "human eye" wavelengths) and sunlight (visible plus infrared wavelengths). The two main applications for using the light sensor module 18 to control the dimming of lights are Daylight Harvesting and Lumen Maintenance. In the Daylight Harvesting mode, the dual channel photocell sensor 64 is either positioned where it is exposed primarily to light from the sun (open loop) or where it is exposed to the effects of both the sun and artificial lighting sources that are being controlled (closed loop). Lumen Maintenance involves the control of artificial light to compensate for loss of light output as the lamps age.

In all cases, the effectiveness of a conventional photocell sensor is based to a large part in how well it is positioned in the room. A conventional photocell sensor needs to read the light source it is getting its control levels from and be shielded from all other light sources. By using a multiple channel photocell sensor 64 that can select the wavelengths that are to be monitored, the positioning is less critical and one multiple channel photocell sensor can be used to satisfy the needs of nearly all applications. The same multiple channel photocell sensor 64 can be used to turn zones of lights ON and OFF based on sunlight alone (Open Loop) and also control light levels by dimming in other zones which are illuminated at least in part by artificial light (Closed Loop).

Photocell levels in both occupancy sensor modules 16 and photocell sensor modules 18 can be adjusted either manually or remotely with an 1R remote programming controller 58, and can be directed to take a "snapshot" reading of the present ambient light level. To select the level of light required to allow the occupancy sensor module 16 to turn ON lighting using the Snapshot feature, the operator selects the set level photocell parameter, then press and hold the Snapshot button on the IR remote transmitter 58. The photocell sensor module 18 will first turn the lights OFF in the room, start a 4 second countdown (beep 4 times), and then take a reading (Snapshot) of the room light level. This eliminates the guesswork of conventional systems. After the Snapshot light intensity measurement has been stored, the level can be adjusted up or down as desired by incrementing the value of the stored snapshot light intensity level.

The occupancy and photocell sensor modules detect the light that is used to set operating levels. The occupancy sensors are used to turn on lights when they detect movement into the room (Automatic On). A feature that some conventional sensor modules have is to first sense the amount of sunlight that is already present in the room, and if there is sufficient light, to take no action and the lights are allowed to remain OFF. The way this level is set in most conventional sensors is mechanically by rotating a dial, or setting switches, or actuating a button. Some sensors provide a feedback LED display to help the installer make the adjustment. All of these methods require the installer to get on a ladder and physically adjust the sensor; then, get down off of the ladder and move the ladder out of the way; and then test the sensor to see if it will properly respond. This is a trial and error method and usually must be repeated several times to get the level set correctly.

Photo snapshot or capture according to the power control system 10 allows the photocell sensor module 18 to be accessed remotely either by the network it is attached to or by an IR remote programming unit 58 to trigger the photo snapshot function. When triggered, an occupancy sensor module 16 will first turn off the lights in the room, wait for its photocell 64 to measure the amount of sunlight present, set the desired level, and then turn the lights back ON. This method keeps the installer out of the way while the level is being set.

This method also applies to photocell sensor modules 18 when used in daylight harvesting or lumen maintenance applications. To use this function the interior lights are first adjusted to the levels they need to be at when there is high and low (or no) sunlight. The photo snapshot function is then remotely triggered to set either the high or low sunlight levels. When triggered, the photocell sensor 64 will first adjust the lighting to the proper levels, wait for lights to stabilize, read the levels of sunlight and artificial light, and then set the desired levels. The photocell sensor module 18 can also be instructed to capture one level and then artificially adjust the second level based on the present captured level. For example, the high sunlight level can be captured and the photocell sensor module can be instructed to artificially set the low sunlight level to 80% less sunlight.

All control modules 14, 16, 18, and intelligent switch devices 20, 22 that share the control network 12 are designed to distribute system commands, sensed environmental conditions and device operational status information to all network-connected modules and devices. This arrangement allows the control modules to make system wide decisions. This also keeps network communications to a minimum. Moreover, the communication speeds can be scaled down to allow operation on low baud rate networks. The complete control functionality of the lighting control system 10 can be implemented on a high voltage network where the baud rates can be as low as 20 Hz.

For example, when multiple occupancy sensor modules 16 are used to control a large area, the first occupancy sensor module 16 that senses motion will send a command to turn each driver relay circuit ON, set its timeout delay and send a device status signal which contains it timeout delay value. All occupancy sensor modules 16 keep track of the timeout delays for all relays on the network. As other occupancy sensor modules 16 detect motion, they are not required to transmit so long as device status information is detected which indicate that the common relay driver circuits are still ON. When the time to turn OFF the relay driver circuits becomes less than one minute, all occupancy sensor modules 16 will have an opportunity to transmit a timeout delay reset command to extend the timeout delay. Those occupancy sensor modules 16 that are set with a longer timeout delay will be allowed to transmit first. This will prevent other sensor modules 16 with a shorter timeout delay from transmitting their reset command. For systems where all occupancy sensor modules 16 have a timeout delay set to 15 minutes, the average time between commands will be about 10 to 14 minutes when there is normal motion in the room.

Because of distributed intelligence on the network, a photocell sensor module can periodically send a command that indicates that the sun is at 40% between its High Sun Set point and Low Sun Set Point. Dimmer modules on the network will automatically adjust between previously configured High/Low sun set points. Each dimmer module can be assigned custom high and low set points. This allows one sensor to control multiple dimmers, rather then requiring a separate sensor on each set of lighting circuits.

The power pack modules 14, occupancy sensor modules 16, photocell sensor modules 18, dimmers, and switch stations 20, 22 operate on a shared network 12 and use that network to share data and current device status information in order to make the overall lighting control system 10 more intelligent, responsive and dynamic. Conventional control systems are constructed by either directly wiring each sensor in a specific pattern to create a multi functioning system, or by connecting modules in a network to report back their levels to a room controller where energy management decisions are made. Either way, conventional control modules all act in a fixed manner and their functions can be changed only by rewiring or reprogramming. The distributed intelligence arrangement of the power control system 10 makes use of sensing modules that can be dynamically reconfigured and that make decisions based on how the lighting control system is currently being used, and based on local changes in environmental conditions.

One example is rooms that are configured for normal occupancy during the day but have little or no occupancy (except for janitor crews) at night. During the day, the occupancy sensor modules 16 increase their sensitivities and timeout delays for monitoring occupied spaces, but at night they reduce their sensitivities and delays to allow only large movements to turn the lights ON and set shorter timeouts to turn the lights OFF. The power pack dimmer module 14 also uses motion information from the occupancy sensor modules 16 to slowly dim the lights down to a more energy saving level when the space is not occupied but still requires some lighting.

The photocell sensor module 18 will only send control commands to the dimmer circuits (Daylight Harvesting is enabled) when it determines that an occupancy sensor module 16 (or an intelligent switch 20, 22) has turned ON the control relays assigned to it, and that the room scene has been set to ON. This allows the photocell sensor module 18 to disengage (Daylight Harvesting is disabled) when a different Scene is selected (for example, lights are lowered for watching a screen presentation), or if one row of lights are turned OFF (for example, from a wall switch).

When Daylight Harvesting is enabled, the photocell sensor module 18 will send current device status information containing the relative sunlight levels to the dimmer modules (0% for zero or low sunlight up to 100% for maximum sunlight). This allows the dimmer modules to decide how to control their dimmers. When used in multi-zone applications this will allow some zones (for example, those located close to windows) to vary quite a bit or even turn ON and OFF in response to sunlight changes while other areas vary only a little (located further from the windows). The role of the photocell control module 18 is to send current sunlight intensity status information over the network whereby the other control modules can use that information to adjust or remain unchanged as needed.

The occupancy sensor modules 16 can control multiple relays while the photocell module 18 can add or subtract additional relay loads based on current sunlight level. In a large room, multiple occupancy sensor modules 16 can share information so that when one sensor is detecting a lot of activity, the other occupancy sensors can reduce their sensitivity thresholds to avoid false triggering. Moreover, when all occupancy sensor modules have agreed that the lights will turn OFF, for example in 5 seconds, all modules will sound out an audible beep to warn anyone in the monitored areas that the lights are about to turn OFF. Any wall button station 20, 22 can sound a beep warning as well.

Each control module 16, 18 can be programmed directly by pushbutton switches, indirectly by the IR Remote transmitter 58, or indirectly over the network from another control module. For example, when one occupancy sensor module 16 is being adjusted for delay timing, it can command all other control modules to set their timing to the same delay. Using the IR Remote transmitter 58, the control modules can be commanded to be included or excluded from a particular network parameter setting. Another example is that any control module or intelligent switch can be used to set lighting scene levels to any attached dimmer control modules.

Energy management of buildings and rooms within buildings require a combination of timers to turn lights ON and OFF at fixed times of the day and week, occupancy sensors to turn lights OFF when rooms or spaces are no longer occupied, and photocell sensors to adjust the light levels in rooms and spaces. Other networks (for example, building control networks) can connect to the network 12 and can also extract control information from the room being monitored. Current status information such as occupancy, light level, scene selections and the like can be used to share with other room controllers or building management systems for broader control options.

For example, when a room is subdivided by retractable walls to provide multiple spaces or one large space, occupancy sensor information in all spaces must now be shared for the large space to properly function. To accomplish this, a Room Combine command is communicated over the network 12 to all appropriate control modules. The control modules will then respond by increasing their timeout (and/or sensitivity) to accommodate the requirements of a larger area. The lighting loads will not turn OFF until all control modules have timed out.

Another example is to use the occupancy control module information (not the lights ON/OFF information) to inform the building information system that a space has been occupied. This allows building management systems to avoid turning OFF air conditioning to rooms that still have occupancy but may have turned the lights OFF for a screen presentation.

The distributed intelligence features of the lighting control system 10 permit a building management system to selectively configure the lighting for a room for different modes of operation. The Automatic ON operating mode allows the power control system 10 to function based on how it was originally configured. The Intelligent OFF operating mode allows the power control system 10 to turn OFF lighting loads according to an automatic day schedule, and increases the sensitivity and timeouts when the room is to be occupied but will have little movement (for example, nap time for daycare centers). When the lights are manually turned off by a touch pad switch, the lighting loads will continue to stay OFF as long as occupancy is detected within the space. Also, even though the lights are OFF, the lighting control system 10 detects that the space is still occupied and can report this information to building management system for tracking purposes. Once the space is vacated for the user-defined time-out period, the system will re-arm and automatically turn ON with next occupancy.

The After Hour operating mode allows the power control system 10 to reduce its sensitivity to human movement, decrease timeouts before turning lights OFF, and requires that the lighting loads must be turned ON from a wall switch rather than automatically turning the lights ON when first detecting movement. The Test mode allows all time outs to be accelerated for rapid system testing (for example, 15 minute delays to turn lights off become 15 second delays).

As new control modules or intelligent switches are added to the network 12, the shared information allows all control modules to perform their functions without requiring replacement or re-wiring of control modules already connected to the network.

An example of a shared application among multiple control modules is as follows. When an occupancy sensor module 16 detects motion it uses its internal photocell 64 to make a decision to turn the lighting ON. When the ambient light level is already high due to available sunlight, the occupancy sensor module will keep the lights OFF. If the available sunlight is low because of early morning or a cloudy day the occupancy sensor module 16 will turn the lights ON when motion is detected. The power pack dimmer module 14 will turn the lights ON and set the light level to full. Once the lights turn ON the photocell sensor module 18 will then take over the control of the light level. As the sunlight gets brighter, the photocell sensor module 18 will start reporting an increase in sunlight percentage. The power pack dimmer module 14 will respond by reducing the dimmer light level. Once motion is no longer detected the occupancy sensor module 16 will turn the lights OFF. The photocell 64 will then disengage its updating of the sunlight intensity levels.

The dimmer control module 14 can also be set into a Set High Trim Mode to allow the maximum dimmer level to be set. Once in this mode, the dimmer module output adjusts to the selected level and then "learns" it in response to actuation of the Set button, or receipt of an IR command from a remote programming unit58, or in response to a network Set command.

Therefore, the lighting control system 10 provides five ways of reducing energy usage. First, by turning OFF the lighting when there is no longer any movement in a room. Second, by not automatically turning the lighting ON when there is enough sunlight already in the room. Third, by limiting the maximum level at which the lighting can be set to (High Trim). Fourth, by only turning the lighting ON to a Set Level (when occupancy is first detected). And finally, by dimming the lighting when an increase in sunlight is detected.

The invention has been particularly shown and described with reference to a preferred lighting control embodiment in which examples have been given to explain what we believe is the best way to make and use the invention. It will be understood by those skilled in the art that various changes in form and detail may be made therein without departing from the spirit and scope of the invention.

The invention claimed is:

1. A system for controlling the application of operating power to electrical loads, comprising:
    a network including communication media and a plurality of control modules coupled to the media, each control module configured to send, receive, and process program commands, information relating to module operating status and sensed environmental conditions to and from other control modules connected to the network;
    each control module including stored parameters which determine its operating performance, and each control module being configured to set the value of each parameter to a value selected from a set of stored operational values in response to a program command communicated over the network;
    each control module including a sensor for sensing an environmental condition selected from the group consisting of sunlight, artificial light, motion of a body within a defined zone of interest, temperature, vibration and sound;
    each control module being configured to store device operational status information and information relating to a sensed environmental condition;
    each control module being configured to change the set value of one or more of its operating parameters to a different value selected from a set of stored operational values at least in part in response to environmental status information or device operational status information communicated over the network from one or more network-connected control modules;
    wherein at least one of the control modules further includes a multiple-channel photo sensor used for sensing sunlight, the multiple-channel photo sensor including one or more sensor channels capable of sensing light wavelengths primarily in the infra-red spectrum and one or more sensor channels to sense light wavelengths primarily in the laser light spectrum;
    the infra-red spectrum photo sensor channel of the multiple-channel photo sensor in the control module being configured to remotely select and set two or more of the control modules to operate in a wide area programming mode in response to an infra-red program command signal communicated wirelessly to the infra-red photo sensor channel by a remote transmitter; and
    the laser spectrum photo sensor channel of the multiple-channel spectrum photo sensor being configured to remotely select and set one and only one control module to operate in a single-module programming mode of operation in response to a laser command signal communicated wirelessly to the laser photo sensor channel from the remote transmitter.

2. The power control system as set forth in claim 1, wherein:
    at least one of the control modules connected to the network is configured to receive an environmental condition status signal communicated over the network, wherein the at least one of the control modules is used to perform an electrical load control function in response to information contained in the status signal.

3. The power control system as set forth in claim 1, wherein at least one of the control modules comprises a photocell sensor for sensing ambient light intensity and an occupancy sensor for controlling the ON/OFF application of operating power to a lighting load in accordance with the detection of motion in an area, thereby providing instantaneous measurement of sunlight and ambient light level inside a defined area; and memory for storing the measured light value, and the occupancy sensor module being configured to momentarily turn OFF all lights in the defined area during a light intensity measurement interval.

4. The power control system as set forth in claim 1, wherein the at least one of the control module photocell sensor for sensing ambient light intensity in a given area and for producing an output status signal that is a relative percentage of a maximum measured ambient light intensity detected over a predetermined monitoring interval.

5. The power control system as set forth in claim 1, further comprising an interface switch connected to at least one control module for enabling manual input of programming commands.

6. The power control system according to claim 1, wherein one control module is a switch that includes a manually operable electrical switch for turning electrical power to a load ON and OFF.

7. The power control system according to claim 1, wherein at least one control module comprises a dimmer for adjusting the brightness of a lamp.

8. The power control system according to claim 1, wherein at least one control module comprises a relay for controlling the application of electrical power to a lighting load.

9. The power control system according to claim 1, wherein at least one control module comprises a ballast control circuit adapted to generate a light level voltage control signal and applying it to an electronic ballast of a fluorescent lighting load.

10. A lighting control system for controlling the application of operating power to electrical loads, comprising:
- a network including communication media and a plurality of control modules coupled to the media, each control module being configured to send, receive, and process program commands, information relating to the operational status of the control module, and information relating to an environmental condition sensed by the control module to and from other control modules connected to the network;
- at least one of the control modules comprising a sensor capable of sensing the emission of light from at least one source in the photo-emitter group consisting of solar radiation, incandescent lighting, florescent lighting, infra-red light beams and laser light beams, and the at least one control module is capable of communicating a module status signal containing information relating to a sensed photo emission to other control modules that are connected to the network;
- at least one control module connected to the network is adapted to receive a module status signal communicated over the network and to respond to information contained in the status signal to perform an electrical load control function;
- the sensor for the at least one control module being a multiple-channel photocell sensor for sensing both ambient light intensity and the infra-red spectrum;
- the control module being configured to remotely select and set two or more of the control modules to operate in a wide area programming mode in response to an infra-red program command signal communicated wirelessly to the multiple-channel photo sensor; and
- the multiple-channel photo sensor being configured to remotely select and set one and only one control module to operate in a single-module programming mode of operation in response to a laser command signal communicated wirelessly to the multiple-channel photo sensor.

11. The lighting control system as set forth in claim 10, wherein:
- each control module including a set of operating parameters which determine its operating performance, wherein each operating parameter is settable to a value selected from a stored set of operational values in response to a program command communicated over the network; and
- each control module being configured to change the set value of one or more of its operating parameters to a different operational value selected from the set of stored operational values at least in part in response to operational status information communicated over the network from another network-connected control module.

12. A lighting control system for controlling the application of operating power to electrical lighting loads, comprising:
- a network including communication media and a plurality of control modules coupled to the media,
- each control module being configured to send, receive, and process digital data to and from other control modules connected to the network;
- at least one of the control modules comprising a multiple-channel photo sensor adapted for sensing sunlight,
- the multiple-channel photo sensor including one or more sensor channels capable of sensing light wavelengths primarily in the infra-red spectrum and one or more sensor channels capable of sensing light wavelengths primarily in the laser spectrum discernable by the human eye, and
- the at least one control module capable of communicating a module status signal containing information relating to a sensed photo emission to other control modules that are connected to the network; and
- the at least one control module being configured for photo sensing operation of the at least one control module in a selected plurality of the sensor channels to determine both levels of light values representing artificial light and levels of light values representing sunlight
- the multiple-channel photo sensor of each control module being configured to remotely select and set two or more of the control modules to operate in a wide area programming mode in response to an infra-red program command signal communicated wirelessly to the multiple-channel photo sensor by a remote transmitter
- the multiple-channel photo sensor being configured to remotely select and set one control module to operate in a single-module programming mode of operation in response to a laser command signal communicated wirelessly to the laser photo sensor.

\* \* \* \* \*